United States Patent
Khosravani

(10) Patent No.: US 10,640,232 B2
(45) Date of Patent: May 5, 2020

(54) CONDUCTIVE FASTENING SYSTEM FOR COMPOSITE STRUCTURES

(71) Applicant: The Boeing Company, Chicago, IL (US)

(72) Inventor: Shahriar Khosravani, Everett, WA (US)

(73) Assignee: The Boeing Company, Chicago, IL (US)

(*) Notice: Subject to any disclaimer, the term of this patent is extended or adjusted under 35 U.S.C. 154(b) by 607 days.

(21) Appl. No.: 15/384,480

(22) Filed: Dec. 20, 2016

(65) Prior Publication Data

US 2018/0170576 A1 Jun. 21, 2018

(51) Int. Cl.
*F16B 35/04* (2006.01)
*B64D 45/02* (2006.01)
(Continued)

(52) U.S. Cl.
CPC ............ *B64D 45/02* (2013.01); *F16B 5/0642* (2013.01); *H01B 1/22* (2013.01); *H01R 4/04* (2013.01); *B29C 65/489* (2013.01); *B29C 65/4855* (2013.01); *B29C 65/4875* (2013.01); *B29C 65/562* (2013.01); *B29C 65/72* (2013.01); *B29C 66/1122* (2013.01); *B29C 66/21* (2013.01); *B29C 66/30322* (2013.01); *B29C 66/50* (2013.01); *B29C 66/721* (2013.01); *B29C 66/7212* (2013.01); *B29C 66/73161* (2013.01); *B29C 2793/0045* (2013.01); *B29C 2793/0081* (2013.01); *B29K 2505/02* (2013.01); *B29K 2505/08* (2013.01); *B29K 2505/10* (2013.01); *B29K 2995/0005* (2013.01);

(Continued)

(58) Field of Classification Search
CPC ....................................................... H01M 4/624
USPC .......................................................... 411/424
See application file for complete search history.

(56) References Cited

U.S. PATENT DOCUMENTS 4,428,867 A * 1/1984 Billias .................... B64D 45/02
156/305
4,556,591 A * 12/1985 Bannink, Jr. ......... B29C 65/601
428/43

(Continued)

FOREIGN PATENT DOCUMENTS

JP 3596563 B2 12/2004
WO 02082468 A1 10/2002

OTHER PUBLICATIONS

Search Report for related Application No. 17206395.0; report dated Mar. 1, 2018.

*Primary Examiner* — Gary W Estremsky
(74) *Attorney, Agent, or Firm* — Miller, Matthias & Hull LLP

(57) ABSTRACT

A conductive fastener system for connecting a composite structure to a support structure includes a composite structure hole that extends through the composite structure and shares a common axis with a support structure hole that extends at least partially through the support structure. A fastener comprising a shank having an outer surface passes through the composite structure hole and at least partially through the support structure hole and provides an annular space between the outer surface of the shank and the inner surface of the composite structure hole. The annular space is filled with a conductive paste that comprises conductive particles suspended in a bonding agent.

20 Claims, 3 Drawing Sheets

(51) Int. Cl.

| | | |
|---|---|---|
| *H01B 1/22* | (2006.01) | |
| *H01R 4/04* | (2006.01) | |
| *F16B 5/06* | (2006.01) | |
| F16B 33/00 | (2006.01) | |
| F16B 1/00 | (2006.01) | |
| B29C 65/48 | (2006.01) | |
| H01R 4/64 | (2006.01) | |
| H01R 4/30 | (2006.01) | |
| B29C 65/00 | (2006.01) | |
| F16B 11/00 | (2006.01) | |
| B29L 31/30 | (2006.01) | |
| B29C 65/72 | (2006.01) | |
| B29K 505/10 | (2006.01) | |
| B29L 31/00 | (2006.01) | |
| B29K 505/02 | (2006.01) | |
| B29C 65/56 | (2006.01) | |
| B29K 505/08 | (2006.01) | |

(52) U.S. Cl.
CPC ............... *B29L 2031/3082* (2013.01); *B29L 2031/3085* (2013.01); *B29L 2031/7172* (2013.01); *F16B 11/006* (2013.01); *F16B 33/004* (2013.01); *F16B 2001/0064* (2013.01); *H01R 4/308* (2013.01); *H01R 4/64* (2013.01); *H01R 2201/26* (2013.01)

(56) References Cited

U.S. PATENT DOCUMENTS

| | | | | |
|---|---|---|---|---|
| 4,755,904 | A * | 7/1988 | Brick | B64D 45/02 |
| | | | | 244/1 A |
| 6,139,777 | A * | 10/2000 | Omoya | H05K 1/095 |
| | | | | 156/306.3 |
| 6,327,132 | B1 * | 12/2001 | Andrivet | B29C 70/885 |
| | | | | 244/1 A |
| 8,945,436 | B2 * | 2/2015 | Aoyagi | H01B 1/16 |
| | | | | 252/512 |
| 9,957,063 | B2 * | 5/2018 | Kawashima | B64D 37/32 |
| 2002/0005247 | A1 * | 1/2002 | Graham | C09J 9/02 |
| | | | | 156/291 |
| 2009/0073548 | A1 | 3/2009 | Youngs | |
| 2013/0330145 | A1 | 12/2013 | Cloud | |
| 2016/0194091 | A1 * | 7/2016 | Obuchi | F01D 9/02 |
| | | | | 415/200 |
| 2016/0229552 | A1 * | 8/2016 | Gross | B22F 7/062 |

* cited by examiner

CONDUCTIVE FASTENING SYSTEM FOR COMPOSITE STRUCTURES

BACKGROUND

Technical Field

This disclosure relates generally to conductive fastening systems for connecting composite structures to supporting structures. More specifically, this disclosure relates to fastening systems for conductive joints between composite structures and underlying support structures that maintain the integrity of the composite structures in the event of a lightning strike.

Description of the Related Art

Airplanes are frequently struck by lightning. In fact, airplanes can actually trigger lightning when flying through a charged region of a cloud. Initially, the lightning will attach to an extremity of the airplane, such as the nose or a wing tip. As the airplane flies through the lightning flash, the current will flow through the outer skin and other structures of the airplane before exiting off another extremity, such as the tail. Airplanes are designed to ensure that there are no gaps in this conductive path. While some airplanes are built with conductive aluminum skins, newer airplanes may have skins made from less conductive composite materials.

Composite materials comprise two or more constituent materials, including a matrix material and a reinforcement material. Composite materials used for airplane skins include carbon fiber reinforced polymers ("CFRPs") wherein a polymer resin serves as the matrix and is reinforced with carbon fibers. Carbon fibers are more conductive than polymer resins and therefore serve as the primary conductor when lightning strikes an airplane equipped with a CFRP skin.

One issue associated with the use of CFRPs for outer skins of airplanes is the means for connecting the CFRP panels that form the skin to the underlying support structure. Specifically, when holes are drilled through the composite skin for receiving bolts or fasteners that attach the composite skin to the support structure, the inner surfaces of the holes can be rough and include indentations that form gaps between the fibers and the metal fasteners. In the event of a lightning strike, these gaps can disrupt the conductive path through the composite skin and create an electrostatic force build-up at the CFRP/fastener interface, which can damage the composite skin through Joule heating and generate hazardous sparks. The physical reason behind the Joule heating and damage at the CFRP/fastener shank interface is the deficient connectivity between the fibers and the fastener, caused by the drilling process. The remaining connected fibers become overloaded with the lightning current surge and, as a result, the overloaded fibers transfer heat to the adjacent resin matrix. While the CFRP fibers are resilient to heat, the resin heats rapidly, adiabatically and immediately begins to decompose, generating hot gas and plasma in microseconds. The heating and decomposition of the resin causes high local Joule heating near the annulus between the fastener and the CFRP. The outgassing and hot plasma will form a shock wave that may propagate through any open pathway.

In an attempt to prevent such problems and provide a reliable connection between the fibers and the fasteners, the fasteners may be coated with a conductive sealant or, alternatively, the fasteners may be inserted through a conductive sleeve. Currently available conductive sealants include a resin or polymer with conductive filler, such as metallic particles, dispersed within the resin. Because the particles are spaced apart within the resin as shown in FIG. 5, electrostatic forces can be created, which can lead to the degradation of the resin and the formation of superheated gases and particles. Conductive sleeves can still leave gaps between the sleeve and the fibers and therefore also does not provide a solution to this problem. Further, the sleeves are expensive to make and time consuming to install.

An improved means for connecting a composite structure to a metallic fastener in a in an electrically conductive manner is needed that is reliable and that reduces manufacturing costs.

SUMMARY OF THE DISCLOSURE

A fastener system for connecting a composite structure to a support structure includes a composite structure hole extending through the composite structure and sharing a common axis with a support structure hole extending at least partially through the support structure. The composite structure hole and support structure hole each have an inner surface that surrounds the common axis. The system includes a fastener that comprises a shank having an outer surface. The fastener passes through the composite structure hole and at least partially through the support structure hole and provides an annular space between the outer surface of the shank and the inner surface of the composite structure hole. A conductive paste is placed in the annular space. The conductive paste comprises conductive particles suspended in a bonding agent wherein a volume of the conductive particles in the conductive paste exceeds a volume of the bonding agent in the conductive paste.

A conductive composite joint between a composite structure and a support structure is also disclosed. The composite structure is positioned adjacent to the support structure and comprises a composite structure hole extending through the composite structure. The support structure comprises a support structure hole extending at least partially through the support structure. The composite structure hole and support structure hole are coaxial and each has an inner surface. The connection further includes a fastener that comprises a shank having an outer surface. The fastener passes through the composite structure hole and at least partially through the support structure hole and provides an annular space between the outer surface of the shank and the inner surface of the composite structure hole. A conductive paste is placed in the annular space. The conductive paste comprises conductive particles suspended in a bonding agent, wherein a ratio of a volume of the conductive particles to a total volume of the conductive paste disposed in the annular space exceeds 0.70.

A method of mechanically and electrically connecting a composite structure to a support structure is disclosed, which comprises: mixing conductive particles having a mean particle size of about 30 microns with a bonding agent to provide a conductive paste having a volumetric ratio of conductive particles to a total volume of the conductive paste of at least about 0.70; positioning the composite structure adjacent to the support structure; providing a hole that extends coaxially through the composite structure and support structure; forming a countersink coaxially with the hole in the composite structure opposite the support structure; at least partially filling the countersink and the hole with the conductive paste; providing a fastener having a shank disposed between a proximal head and a distal threaded end; inserting the fastener into and through the hole such that the head is disposed in the countersink and the threaded distal end extends beyond the support structure; threadably coupling a nut onto the threaded distal end of the fastener; and tightening the nut thereby providing an electrical contact or connection between the composite structure and the fastener with the conductive paste.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the examples illustrated in greater detail on the accompanying drawings, wherein.

The drawings are not necessarily to scale and may illustrate the disclosed examples diagrammatically and/or in partial views. In certain instances, the drawings may omit details which are not necessary for an understanding of the disclosed methods and apparatuses or which render other details difficult to perceive. It should be understood, of course, that this disclosure is not limited to the particular examples illustrated herein.

DETAILED DESCRIPTION

Figure 1:
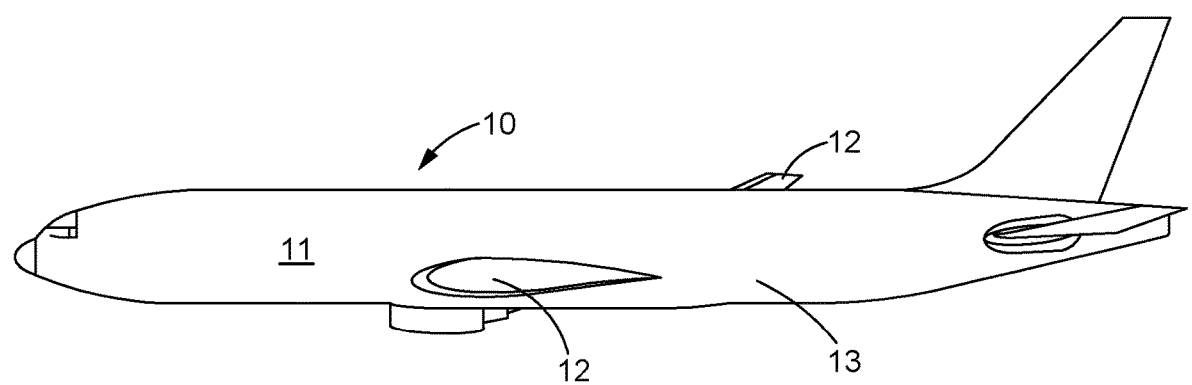
FIG. 1 is a side view of an airplane with a composite outer skin.

FIG. 1 illustrates an aircraft 10 with an outer skin 11 fabricated from a composite material, such as CFRP or other composite materials known to those skilled in the art. The outer skin 11 forms at least part of the wings 12 and fuselage 13, both of which include interior fuel tanks.

Figure 2:
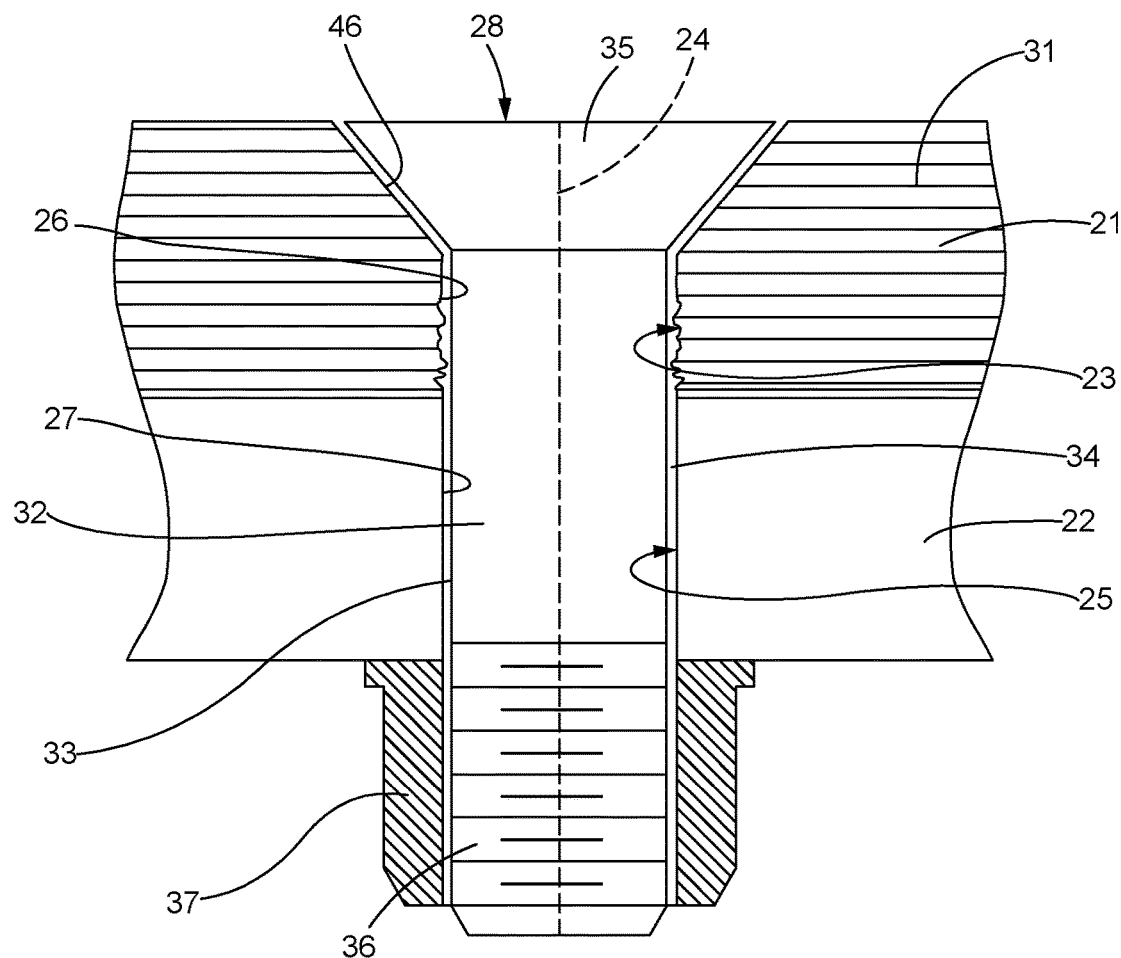
FIG. 2 is a sectional view of a fastening system for connecting a composite structure to a support structure with a fastener.

To address the problems created by lightning strikes engaging composite structures and other EMEs, this disclosure reveals a fastener system 20 for connecting a composite structure 21 to a support structure 22 as shown in FIG. 2. The fastener system 20 comprises a composite structure hole 23 extending through the composite structure 21 and sharing a common axis 24 with a support structure hole 25 that extends at least partially through the support structure 22. The composite structure hole 23 and the support structure hole 25 each have inner surfaces 26, 27 respectively. In the examples shown in FIGS. 2-4, the inner surface 26 of the composite structure hole 23 is rough with indentations 44 extending radially away from the fastener 28 and into the composite structure 21. The roughness of the inner surface 26 is a result of drilling the composite structure hole 23 through the composite structure 21, which typically includes fibers 31. The combination of the plastic or resin and the fibers 31 of the CFRP render the CFRP prone to chipping during drilling, punching or other means for formation of the composite structure hole 23, thereby producing the rough inner surface 26 with indentations 44.

Figure 3:
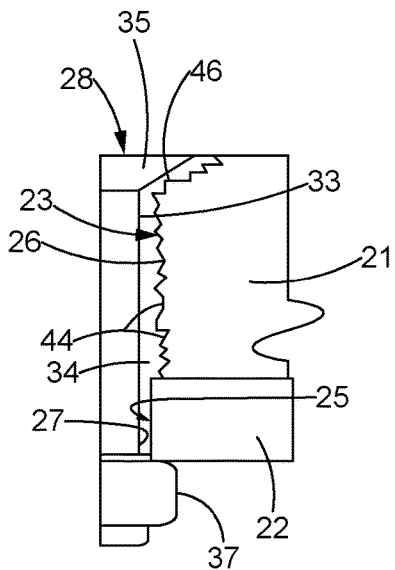
FIG. 3 is a partial sectional view of the fastening system of FIG. 2, particularly illustrating roughness and indentations caused by drilling the hole through the composite structure that accommodates the fastener.
Figure 4:
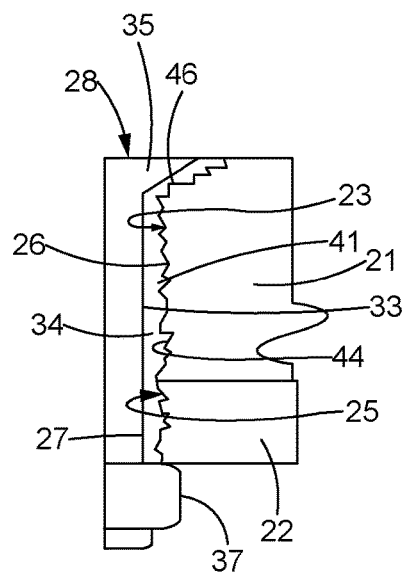
FIG. 4 is another partial sectional view of the fastening system shown in FIG. 3, particularly illustrating the use of a conductive paste in the annular space between the fastener and the composite structure for providing electrical conductivity between the composite structure and the fastener.

The fastener 28 comprises a shank 32 having an outer surface 33. The fastener 28 passes through the composite structure hole 23 and at least partially through the support structure hole 25 resulting in an annular space 34 between the outer surface 33 of the shank 32 and the inner surface 26 of the composite structure hole 23. The shank 32 of the fastener 28 extends between a head 35 and a threaded distal end 36, which threadably engages a nut 37. Tightening of the nut 37 results in a clamping of the composite structure 21 to the support structure 22 as illustrated in FIGS. 2-4. Alternatively, the support structure hole 25 could be threaded and the threaded distal end 36 of the fastener 28 may be threadably coupled to the support structure 22.

Figure 5:
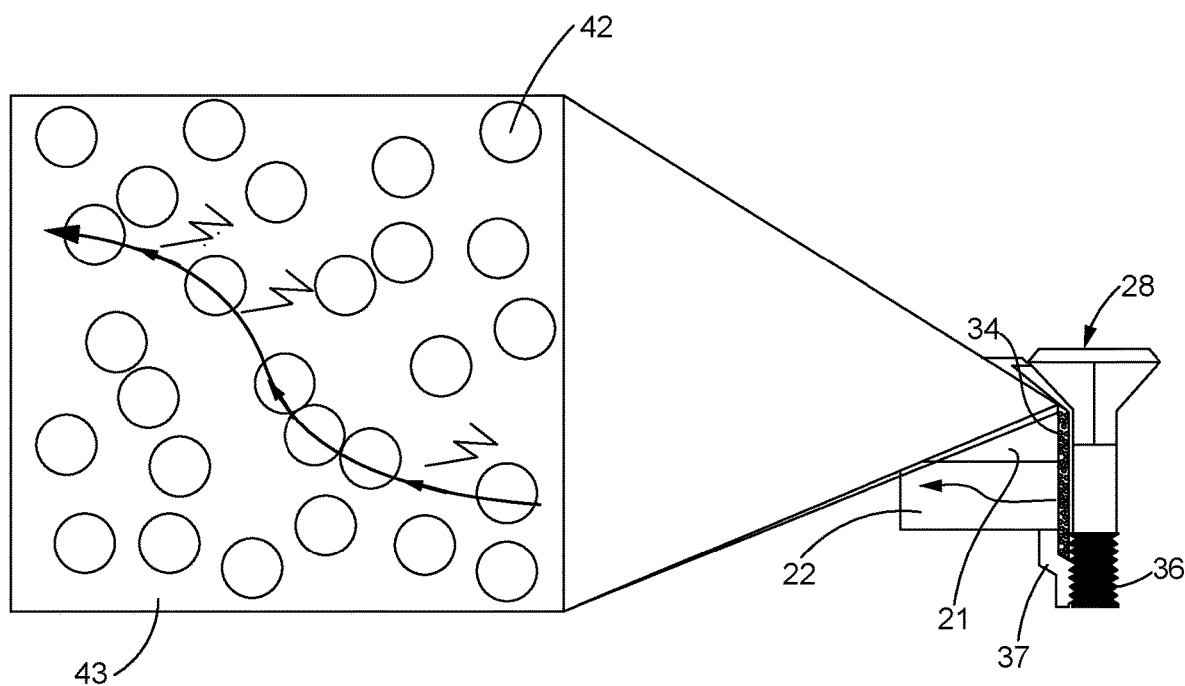
FIG. 5 illustrates, schematically, a conductive paste with an insufficient amount of conductive particles for providing a reliable conductive connection between the composite structure and the fastener.
Figure 6:
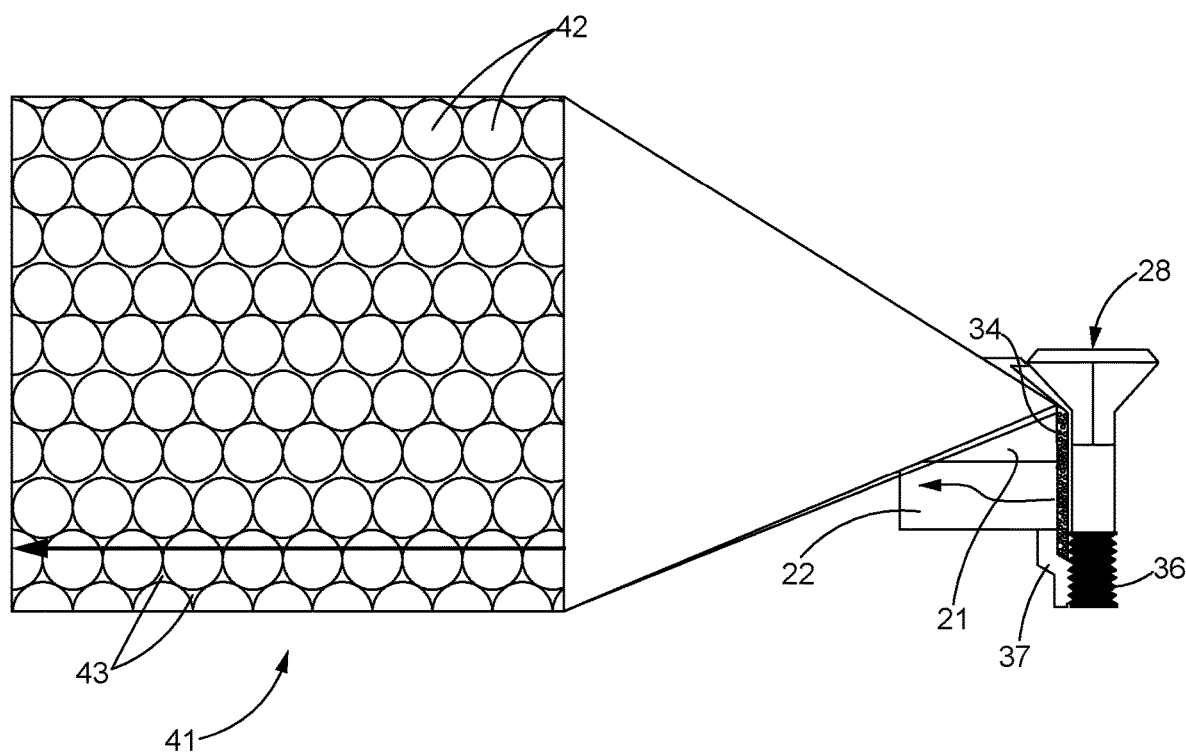
FIG. 6 illustrates, schematically, a conductive paste made in accordance with this disclosure and that includes a sufficient amount of conductive particles for providing a reliable conductive connection between the composite structure (or more specifically, the fibers of the composite structure) and the fastener.

Turning to FIGS. 5-6, a conductive paste 41 is disposed in the annular space 34, between the outer surface 33 of the shank 32 and the inner surface 26 of the composite structure hole 23. The conductive paste 41, as shown in FIG. 6, comprises conductive particles 42 suspended in a bonding agent 43. A volume of the conductive particles 42 exceeds a volume of the bonding agent 43 in the annular space 34 as shown schematically in FIG. 6. For example, a ratio of the volume of the conductive particles 42 to a total volume of the conductive paste 41 (i.e., the combined volumes of the conductive particles 42 and the bonding agent 43) in the annular space 34 exceeds 0.64. This ratio provides suitable connections between the fibers 31 of the composite structure 21 and the fastener 28. To provide an even better connection between the fibers 31 of the composite structure 21 and the fastener 28, a ratio of the volume of the conductive particles 42 to a total volume of the conductive paste 41 in the annular space 34 exceeds 0.70. This ratio, which may be referred to as the "fill factor," must be sufficiently high enough to provide the needed connection between the fibers 31 and the fastener 28. If possible, the ratio or fill factor employed approaches the theoretical maximum value of about 0.74 for spherical conductive particles 42. Employing a ratio that approaches or reaches the theoretical fill factor enhances the reliability of the connection between the fibers 31 and the fastener 28. For uniformly sized, spherical conductive particles 42, the theoretical maximum value for this ratio or fill factor is 74.048% ($\pi/3\sqrt{2}$) of the total volume of conductive paste 41.

FIG. 6 shows a packing of spherical conductive particles 42 that approaches or reaches the theoretical fill factor. In contrast to the dense packing shown in FIG. 6, the conductive paste 41 of FIG. 5 has a lower ratio of the volume of the conductive particles 42 to the total volume of the conductive paste 41. Ratios of less than 0.64, and perhaps less than 0.50, lead to gaps between the conductive particles 42 and a possible generation of electrostatic forces, which can lead to the degradation of the resin and the formation of superheated gases, which can compromise the structural integrity of the composite structure 21.

The size of the conductive particles 42 is relevant. Specifically, it has been found that the size of the indentations 44 along the inner surface 26 of the composite structure hole 23 caused by drilling or punching may average about 100 microns. To fill these indentations 44 with one or more conductive particles 42, the conductive particles 42 may be spherical in shape and have a mean particle diameter or average particle size that is smaller than the indentations 44. In one example, the conductive particles 42 have a mean particle diameter of about 30 microns or less. Spherically shaped conductive particles 42 may be packed more densely than other available shapes and facilitate the ability to increase the ratio of the volume of the conductive particles 42 to the total volume of the conductive paste 41 to a level above 0.70. The ability to increase this ratio to a level approaching the theoretical fill factor enhances the connection between the fibers 31 and the fastener 28.

The conductive particles 42 are fabricated from a material selected from the group consisting of copper, nickel, chromium, aluminum, mixtures thereof and alloys thereof. The use of low melting point materials or alloys is not necessary and the cost of using low melting point alloys may be avoided in favor of using the cheaper and more abundant materials listed above.

A suitably viscous conductive paste 41 facilitates the installation of the disclosed fastener systems 20 and/or fasteners 28, thereby reducing manufacturing costs. While the conductive paste 41 may have a viscosity of less than 10,000 cP (centipoise), a typical conductive paste 41 will have a viscosity in a range from about 1500 to about 3000 cP. The relatively high viscosity makes it easy for a technician to apply the conductive paste 41 to the composite structure hole 23 prior to insertion of the metal fastener 28. The conductive paste 41 may be inserted into the composite structure hole 23 using a variety of known applicators, such as a simple squeeze tube. Therefore, a special applicator for the conductive paste 41 is not required. Further, the conductive paste 41 acts like an incompressible conductive powder due to its maximum or near maximum close fill packing as shown in FIG. 6, the conductive paste 41 in the annular space 34 will have the same mechanical (tensile) performance as a typical but expensive sleeved interference fit fastener.

As shown in FIGS. 2-6, the support structure holes 25 extend through the support structures 22 and the fasteners 28 include a proximal end comprising a head 35 disposed opposite the shank 32 from a threaded distal end 36 disposed beyond the support structure 22. The threaded distal end 36 is threadably coupled to a nut 37 disposed opposite the support structure 22 from the composite structure 21. The composite structure hole 23 includes a countersink or recessed portion 46 for accommodating the head 35 of the fastener 28.

The conductive fastener system 20 physically and electrically connects the composite structure 21, such as an airplane skin, to a support structure 22. The composite structure 21 is positioned adjacent to, on top of or beneath the support structure 22. The composite structure 21 comprises a composite structure hole 23 extending through the composite structure 21 and the support structure 22 comprises a support structure hole 25 extending at least partially through the support structure 22. In FIGS. 2-6, the composite structure hole 23 includes a countersink or recessed portion 46 for accommodating the head 35 of the fastener 28. Further, the support structure hole 25 extends through the support structure 22 and the combination of the head 35 and nut 37 clamps the composite and support structures 21, 22 together. An alternative configuration could include providing threads along the inner surface 27 of the support structure hole 25 for engaging the threaded distal end 36 of the fastener 28 thereby connecting or clamping the composite structure 21 to the support structure 22. The composite structure hole 23 and support structure hole 25 are coaxial, with each having an inner surface 26, 27 respectively. The fastener 28 comprises a shank 32 having an outer surface 33. The fastener 28 passes through the composite structure hole 23 and at least partially through the support structure hole 25 thereby providing an annular space 34 between the outer surface 33 of the shank 32 and the inner surfaces 26, 27 of the composite and support structure holes 23, 25 respectively. The conductive paste 41 is disposed in the annular space 34 and may be applied prior to insertion of the fastener 28. The conductive paste 41 comprises a sufficient amount of conductive particles 42 suspended in a bonding agent 43 so that a ratio of a volume of the conductive particles 42 to a total volume of the conductive paste 41 disposed in the annular space 34 exceeds 0.70 as illustrated in FIG. 6.

A method of mechanically and conductively connecting a composite structure 21 to a support structure 22 is also disclosed. The method comprises mixing conductive particles 42 having a mean particle size of about 30 microns with a bonding agent 43 to provide a conductive paste 41 having a volumetric ratio of conductive particles 42 to a total volume of conductive paste 41 of about 0.74. The composite structure 21 is positioned adjacent to the support structure 22. The method further includes forming holes 23, 25 that extend coaxially through the composite structure 21 and support structure 22 respectively and forming a countersink 46 in the composite structure 21 that is coaxial with the composite structure hole 23 and disposed opposite the composite structure 21 from the support structure 22. The method also comprises at least partially filling the countersink 46 and the composite structure hole 23 with the conductive paste 41. A fastener 28 is provided that has a shank 32 disposed between a proximal head 35 and a threaded distal end 36. The method further includes inserting the fastener 28 into and through the composite structure hole 23 and support structure hole 25 such that the head 35 is disposed in the countersink 46, the threaded distal end 36 extends beyond the support structure 22 and the annular space 34 is filled with conductive paste 41. After threadably coupling a nut 37 onto the threaded distal end 36 of the fastener 28, the nut 37 is tightened.

INDUSTRIAL APPLICABILITY

The disclosed fastening system may be used to connect composite structures, such as the composite outer skin of an aircraft, to a support structure. In the event of a lightning strike, the conductive connection between the composite outer skin to the underlying metal structure provides continuity of current flow through the composite skin and avoids a build-up of electrostatic forces that can damage the composite skin.

While only certain examples have been set forth, alternatives and modifications will be apparent from the above description to those skilled in the art. These and other alternatives are considered equivalents and within the spirit and scope of this disclosure and the appended claims.

The invention claimed is:

1. A fastener system for connecting a composite structure to a support structure, the fastener system comprising:
a composite structure hole extending through the composite structure and sharing a common axis with a support structure hole extending at least partially through the support structure, the composite structure hole and the support structure hole each having an inner surface that surrounds the common axis;

a fastener comprising a shank having an outer surface, the fastener passing through the composite structure hole and at least partially through the support structure hole and providing an annular space between the outer surface of the shank and the inner surface of the composite structure hole; and a conductive paste disposed in the annular space, the conductive paste comprising conductive particles suspended in a bonding agent, wherein the conductive paste has a viscosity of less than 10,000 cP.

2. The fastener system of claim 1 wherein a ratio of the volume of the conductive particles to a total volume of the conductive paste in the annular space exceeds 0.64.

3. The fastener system of claim 1 wherein a ratio of the volume of the conductive particles to a total volume of the conductive paste in the annular space exceeds 0.70.

4. The fastener system of claim 3 wherein the conductive particles are spherical.

5. The fastener system of claim 1 wherein a ratio of the volume of the conductive particles to a total volume of the conductive paste in the annular space is about 0.74.

6. The fastener system of claim 5 wherein the conductive particles are spherical and have a mean particle diameter of about 30 microns.

7. The fastener system of claim 1 wherein the conductive particles are fabricated from a material selected from the group consisting of copper, nickel, chromium, aluminum, mixtures thereof and alloys thereof.

8. The fastener system of claim 1 wherein the conductive paste has a viscosity in a range from about 1500 to about 3000 cP.

9. The fastener system of claim 1 wherein the support structure hole extends through the support structure, the fastener includes a proximal end comprising a head disposed opposite the shank from a threaded distal end disposed beyond the support structure, the threaded distal end threadably coupled to a nut disposed opposite the support structure from the composite structure.

10. The fastener system of claim 9 wherein the composite structure hole includes a recessed portion for accommodating the head of the fastener.

11. The fastener system of claim 1, wherein the inner surface of the composite structure hole includes a plurality of indentations.

12. The fastener system of claim 11, wherein the conductive particles are spherical and have a mean particle diameter that is smaller than the indentations.

13. A conductive connection between a composite structure and a support structure, the conductive connection comprising:

the composite structure positioned adjacent to the support structure;

the composite structure comprising a composite structure hole extending through the composite structure and the support structure comprising a support structure hole extending at least partially through the support structure, the composite structure hole and the support structure hole being coaxial, the composite structure hole and the support structure hole each having an inner surface;

a fastener comprising a shank having an outer surface, the fastener passing through the composite structure hole and at least partially through the support structure hole and providing an annular space between the outer surface of the shank and the inner surface of the composite structure hole; and a conductive paste disposed in the annular space, the conductive paste comprising conductive particles suspended in a bonding agent, wherein the conductive paste has a viscosity of less than 10,000 cP.

14. The conductive connection of claim 13 wherein the conductive particles are spherical and have a mean particle size of about 30 microns.

15. The conductive connection of claim 14 wherein the ratio of the volume of the conductive particles to the total volume of the conductive paste in the annular space is about 0.74.

16. The conductive connection of claim 13 wherein the conductive particles are fabricated from a material selected from the group consisting of copper, nickel, chromium, aluminum, mixtures thereof and alloys thereof.

17. The conductive connection of claim 13 wherein the conductive paste has a viscosity in a range from about 1500 to about 3000 cP.

18. The conductive connection of claim 13 wherein the fastener includes a proximal end comprising a head disposed opposite the shank from a threaded distal end disposed beyond the support structure, the threaded distal end threadably coupled to a nut disposed opposite the support structure from the composite structure.

19. The conductive connection of claim 18 wherein the composite structure hole includes a recessed portion for accommodating the head of the fastener.

20. A method of connecting a composite structure to a support structure with interrupting a conductive path through the composite structure, the method comprising:

mixing conductive particles bonding agent to provide a conductive paste, the conductive paste having a viscosity of less than 10,000 cP;

positioning the composite structure adjacent to the support structure;

providing a hole that extends coaxially through the composite structure and the support structure;

forming a countersink coaxially with the hole in the composite structure opposite the support structure;

at least partially filling the countersink and the hole with the conductive paste;

providing a fastener having a shank disposed between a proximal head and a distal threaded end;

inserting the fastener into and through the hole such that the proximal head is disposed in the countersink and the distal threaded end extends beyond the support structure;

threadably coupling a nut onto the distal threaded end of the fastener; and tightening the nut thereby providing electrical contact between the composite structure, the fastener and the conductive paste.

* * * * *